Dec. 29, 1953 K. McILWAIN 2,664,561

PULSE-CODE SELECTIVE COMMUNICATION SYSTEM

Original Filed Sept. 18, 1945 5 Sheets-Sheet 1

*INVENTOR.*
KNOX McILWAIN
*BY* Harry C. Page
ATTORNEY.

Dec. 29, 1953 K. McILWAIN 2,664,561

PULSE-CODE SELECTIVE COMMUNICATION SYSTEM

Original Filed Sept. 18, 1945 5 Sheets-Sheet 2

INVENTOR.
KNOX McILWAIN,
BY Harry C. Page
ATTORNEY.

Dec. 29, 1953 K. McILWAIN 2,664,561

PULSE-CODE SELECTIVE COMMUNICATION SYSTEM

Original Filed Sept. 18, 1945 5 Sheets-Sheet 3

INVENTOR.
KNOX McILWAIN,
BY Harry C. Page
ATTORNEY

Dec. 29, 1953 K. McILWAIN 2,664,561

PULSE-CODE SELECTIVE COMMUNICATION SYSTEM

Original Filed Sept. 18, 1945 5 Sheets-Sheet 4

INVENTOR.
KNOX McILWAIN,
BY Harry B. Page
ATTORNEY.

INVENTOR.
KNOX McILWAIN,
BY Harry C. Page
ATTORNEY.

Patented Dec. 29, 1953

2,664,561

UNITED STATES PATENT OFFICE 2,664,561

PULSE-CODE SELECTIVE COMMUNICATION SYSTEM

Knox McIlwain, New York, N. Y., assignor to Hazeltine Research, Inc., Chicago, Ill., a corporation of Illinois Continuation of application Serial No. 617,020, September 18, 1945. This application June 13, 1950, Serial No. 167,814

12 Claims. (Cl. 343—6.5)

Figures 1, 3:
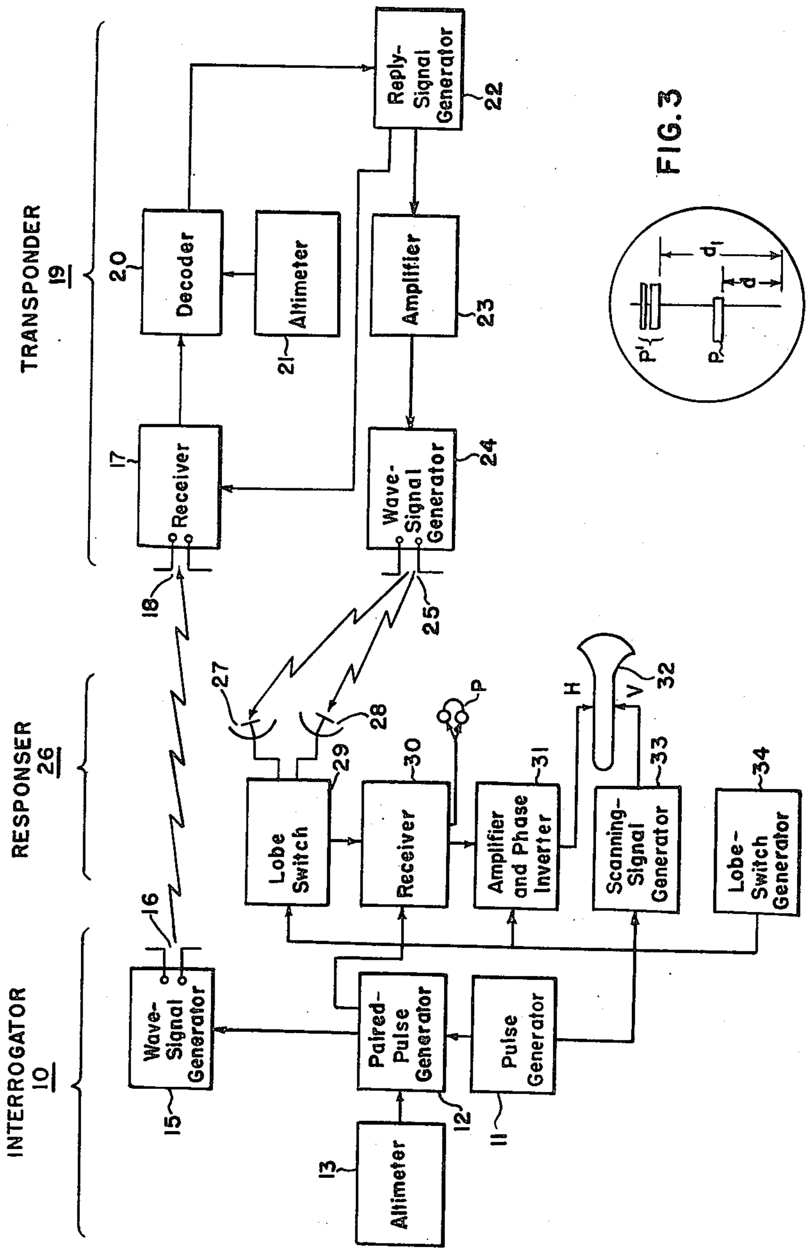

The present invention relates to pulse-code selective communication systems and, particularly, to such systems for communication between two spaced wave-signal stations at least one of which is carried by a mobile object. In greater particularity, the invention relates to a pulse-code selective communication system particularly suited for the navigation, regulation, and control of traffic flow either or both along a traffic route or among a plurality of traffic zones available to mobile objects such, for example, as aircraft, seagoing vessels, and trains. The present invention is a continuation of abandoned application Serial No. 617,020, filed September 18, 1945, and entitled "Pulse-Code Selective Communication System."

Under the presently used plan of commercial aircraft traffic control, flights along prescribed routes are established and navigated either or both by visible landmarks or by radio range or beacon systems. Altitude separation is used in cross-country flight and when "stacked" at an airport with other aircraft awaiting permission to land. In cross-country flight, several aircraft may be permitted to fly at the same altitude level if traveling in the same direction and adequately spaced by their relative departure schedules.

Any condition unexpectedly arising during flight which may upset a flight schedule approved by a traffic-control dispatcher requires an immediate reappraisal of numerous other approved flight schedules which, under the changed condition, may become conflicting. Since this may require immediate modification of numerous other flight schedules then in progress, a heavy burden and responsibility is thrust upon an airport traffic-control dispatcher, perhaps necessitating co-ordinated action with other dispatchers at distant airports, to make immediate and unerring decisions and quickly to issue whatever orders are necessary to effect the necessary flight schedule modifications. Under this plan, all responsibility falls upon one or more traffic-control dispatchers and little responsibility remains with the pilot of an aircraft except to maintain his flight in conformity with the approved flight schedule. Heretofore, the number of commercial aircraft normally in flight at any given time and in any given locality has been so relatively small that this traffic-control procedure has in general been satisfactory. However, with the contemplated substantial increase in the number of aircraft, both commercial and private, which will come into future use within a few years, it has been suggested that this procedure must require substantial revision and modification if it is to have any semblance of utility.

In making any such revisions to current aircraft traffic-control procedure, it would be highly desirable that the responsibility for the major burden of actual flight maneuver be cast upon an aircraft pilot much as the responsibility for safe travel along an automobile highway is cast upon the driver of an automobile. In so doing, it would be desirable that the pilot be assured of remaining by instrument control on an accurately established prescribed course and in a given one of a plurality of accurately established unvarying altitude zones of flight, thus to provide an arrangement analogous to elevated highways for vehicular traffic. This would permit an individual altitude zone to be permanently assigned to air traffic moving toward each given point of the compass and thereby permit indiscriminate crossings of flight routes without creating a hazardous flight condition. While in his given altitude zone, it would further be desirable that the pilot be aware even during extremely poor visibility of the relative position and direction of flight of every other aircraft moving within a given range of him and within the same altitude zone. The pilot thereby would be enabled to maintain an adequate safe spacing between his own craft and others following the same route and would further be enabled, without danger of collision, to establish his own selected holding circle on either side of the prescribed route, as where the traffic became jammed-up for some reason on the course ahead of him. In this desired arrangement, however, the pilot should not be confused by warnings of the presence of aircraft in other altitude zones, since these cannot create a hazardous flight condition for him, except in the case of an aircraft which contemplated moving up or down from an adjacent altitude zone into his own altitude zone. These he should become aware of in sufficient time prior to such movement that he can take proper steps himself to avoid a hazardous flight condition and can warn the approaching aircraft of the dangerous condition which may arise from the maneuver. All such altitude zones should preferably be established and maintained automatically by instrument without resort to the use of a manually set barometer. When this is done, all altitude zones are accurately established without reference to changing barometric pressures at a given locality or as between two widely spaced localities.

It is an object, therefore, of the present invention to provide a new and improved system for communication between two spaced wave-signal stations, at least one of which is carried by a mobile object, which is particularly suited for use in a navigation or traffic-control system, or in a combined navigation and traffic-control system, to avoid one or more of the disadvantages and limitations of prior navigation and traffic-control systems.

It is a further object of the invention to provide a new and improved system for communication between two spaced wave-signal stations, at least one of which is carried by a mobile object, having wide application in navigation or traffic-control systems or in a combined navigation and traffic-control system, and one possessing particular merit as an aid in avoiding collision between mobile vehicles or craft.

It is yet another object of the invention to provide a new and improved system for communication between two spaced wave-signal stations, at least one of which is carried by a mobile object, having high accuracy and reliability of operation yet one which is comparatively simple and utilizes relatively compact and light-weight units of equipment.

In accordance with one form of the invention, a system for communication between two spaced wave-signal stations, at least one of which is carried by a mobile object, comprises a first altitude-responsive device at one of the stations for developing a first control effect representative of altitude and means at the aforesaid one station responsive to that control effect for transmitting wave-signal energy modulated by signal energy of pulse wave form having at least two relatively variable edge portions designating, by their relative amount of variation, an individual one of a plurality of vertically positioned traffic zones available to mobile objects. The system includes means at the other of the stations for receiving the aforesaid modulated wave-signal energy and for deriving in response thereto signal energy having two relatively variable edge portions related to those of the modulation signal energy. The system also includes a second device at the other station for developing a second control effect representative of its altitude, and control means at the said other station responsive to the second control effect for utilizing the derived signal energy only when the aforesaid edge portions thereof have a relative amount of variation lying within a selectable range of values automatically established by the control means under control of the second altitude-representative device as designating a selectable one of the aforesaid plurality of traffic zones.

For a better understanding of the present invention, together with other and further objects thereof, reference is had to the following description taken in connection with the accompanying drawings, and its scope will be pointed out in the appended claims.

Figure 2:
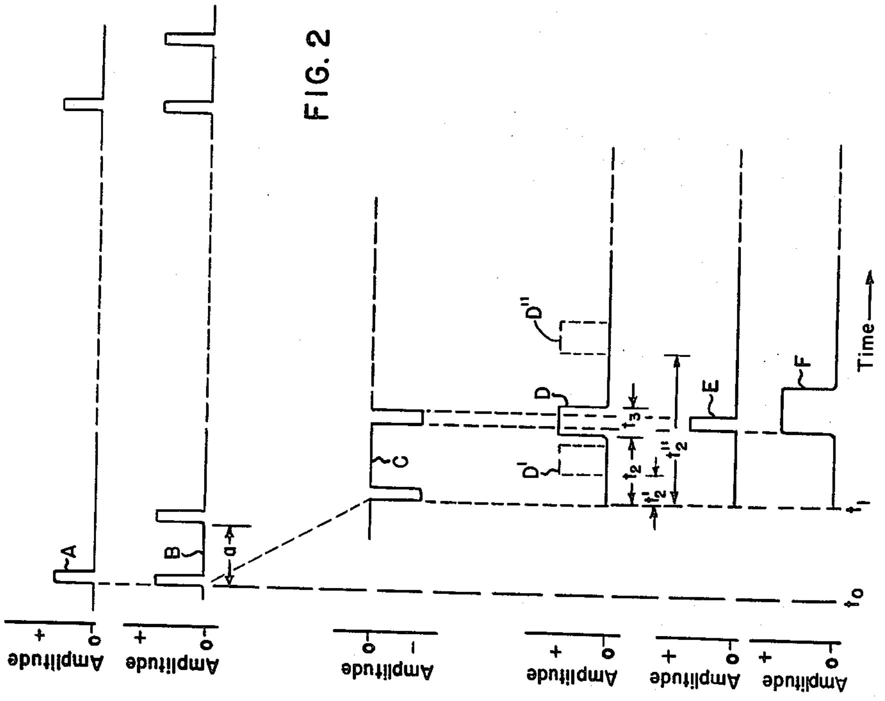
Figures 4, 6:
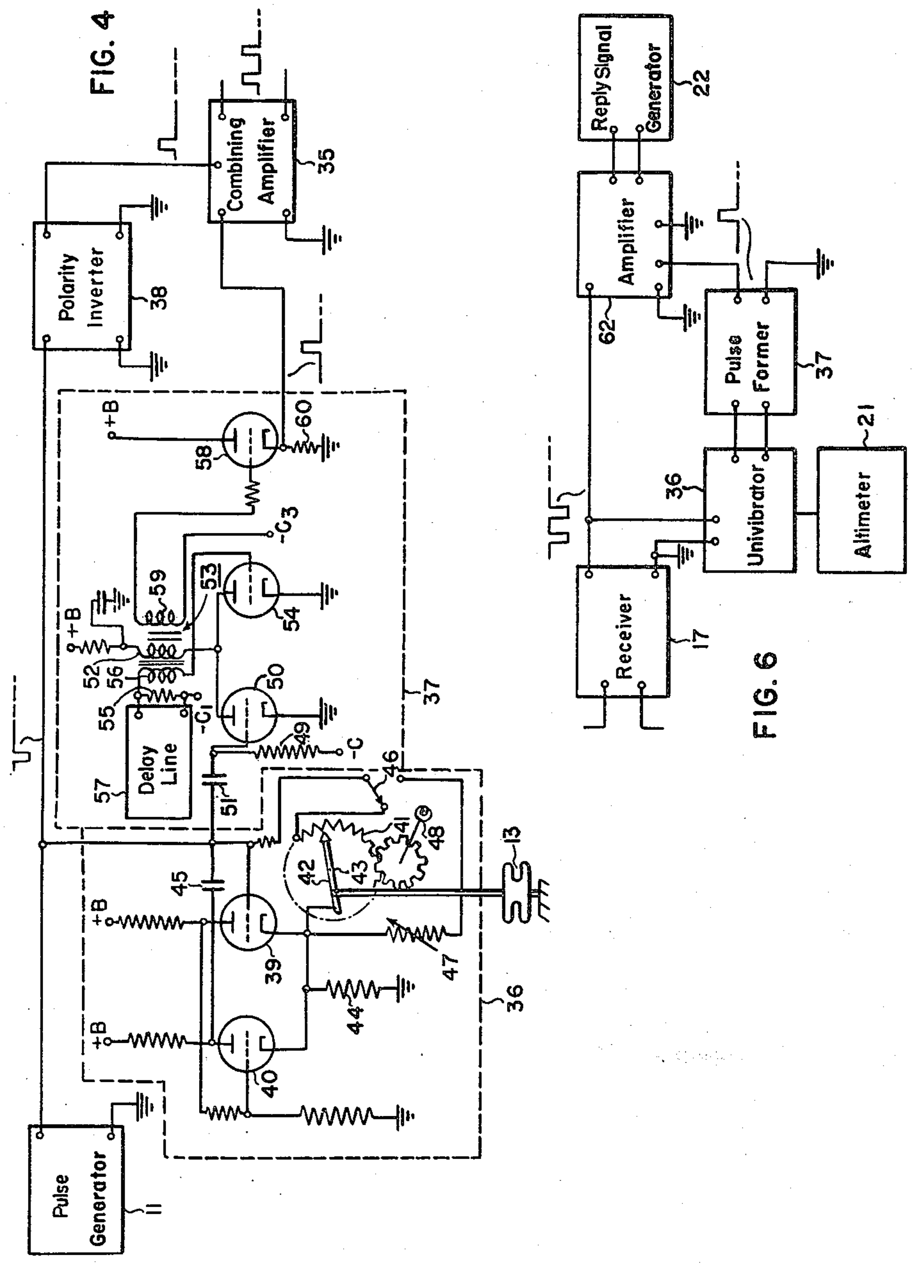
Figure 5:
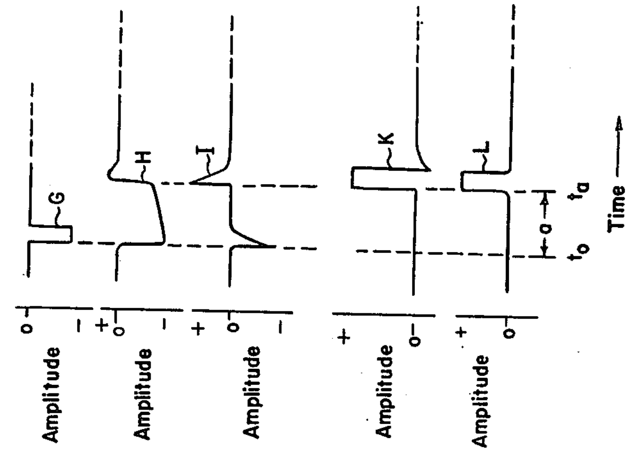

Fig. 1 represents schematically a complete wave-signal communication system embodying the present invention in a particular form; Fig. 2 comprises curves used as an aid in explaining the operation of the Fig. 1 system; Fig. 3 illustrates a representative indication provided by the Fig. 1 system; Fig. 4 is a circuit diagram representative of a particular portion of the Fig. 1 system; Fig. 5 comprises curves used as an aid in explaining the operation of the Fig. 4 arrangement; Fig. 6 represents schematically, but in greater detail, an additional portion of the Fig. 1 system; and Figs. 7–11, inclusive, schematically represent portions of a communication system embodying several modified forms of the invention.

Referring now more particularly to Fig. 1 of the drawings, there is represented a complete system for communication between two spaced wave-signal stations at least one of which is carried by a mobile object. While the communication system of the present invention has wide utility in the traffic control of trains, seagoing vessels and the like, it has particular utility in the navigation, regulation and control of aircraft in flight and will be described in that connection.

As earlier mentioned, the communication system of the present invention is adapted to provide communication between two spaced wave-signal stations at least one of which is carried by a mobile object. The system includes means at one of the stations for transmitting wave-signal energy modulated by signal energy of pulse wave form having at least two relatively variable waveform or edge portions designating by their relative amount of variation an individual one of a plurality of traffic zones available to mobile objects. In particular, the modulation-signal energy preferably has a repeated pulse wave form with grouped pairs of pulses of which the relatively variable wave-form portions thereof mentioned comprise the leading edges of successive pulses of each such pair, whereby the relative spacing between the leading edges designates an individual one of the plurality of traffic zones. For the traffic control of aircraft, these traffic zones are altitude separated zones, that is, zones vertically separated from a reference traffic-zone level which may, for example, be sea level. Where the traffic zones are altitude separated as mentioned, the first-mentioned means may include means for providing a control action varying with the vertical distance or altitude from the reference traffic-zone level. This last-mentioned means may comprise, for example, a barometer or for certain applications a radio altimeter; or a manually adjustable control. It is the purpose of this means by its control action automatically to control the relative amount of variation, for example, the pulse spacing, of the two relatively variable wave-form portions of the modulation-signal energy.

The transmitting means last described will for convenience hereinafter be designated an "interrogator," since its function is to transmit an altitude-coded interrogating wave signal, and is represented in Fig. 1 by the interrogator 10. The interrogator 10 includes a generator 11 for generating a signal of pulse wave form and of constantly periodicity which may, for example, be anywhere from sixty to two thousand pulses per second. An output circuit of the pulse generator 11 is coupled to an input circuit of a paired-pulse generator 12, the detailed arrangement and operation of which will be more fully considered hereinafter, which is controlled in operation by an altimeter 13. The output of the generator 12 is coupled to a modulation input circuit of a wave-signal generator 15. The output circuit of the generator 15 is coupled to an antenna system 16 for radiation of the modulated wave signal.

The communication system also includes means at the other of the stations spaced from the first station for receiving the modulated wave-signal energy and for deriving in response thereto signal energy having two relatively variable wave-form portions varying with those of the modulation-signal energy of the interrogator. In one form of the invention, the derived signal energy has a wave form corresponding to that of the modulation-signal energy and including the two variable wave-form portions thereof, for example, a pulse wave form in which the leading edges of two successive pulses thereof have a spacing varying in correspondence with that of the modulation signal. This means comprises a receiver 17 having an input circuit coupled to an antenna 18 and forming one unit of a transpondor 19.

The communication system, in particular the transpondor 19 thereof, is provided with means including a control means at the other station having a cycle of operation initiated in a predetermined time relationship with the occurrence of one variable wave-form portion of the derived signal energy, for example. the leading edge of a first derived pulse, for utilizing the derived signal energy only when the other variable wave-form portion of the derived signal energy, for example, the leading edge of a successive derived pulse, has a relative amount of variation lying within a selectable range of values established by the control means as designating a selectable one of the plurality of traffic zones. The control means comprises a decoder unit 20, the arrangement and operation of which will be more fully considered hereinafter, having an input circuit coupled to an output circuit of the receiver 17. An altimeter 21 controls the operation of the unit 20. The utilizing means mentioned includes a reply-signal generator 22 having an input circuit coupled to the output circuit of the decoder 20 and having an output circuit coupled to an input circuit of an amplifier 23, and to a gain-control circuit of the receiver 17. The output circuit of the amplifier 23 is coupled to a modulation input circuit of a wave-signal generator 24 to modulate the wave signal generated therein. The output circuit of the generator 24 is coupled to an antenna system 25. Essentially, the units 22, 23 and 24 comprise a transmitter included in the transpondor 19 for transmitting a modulated wave-signal reply, which may in some cases be coded for identification or communication purposes.

The communication system also includes means at the one station, that including unit 10, for receiving the reply wave signal transmitted by the transpondor 19 and for utilizing the modulation components thereof to provide an indication which may simply be an indication that a reply has been received, as when the output of this receiver is applied to a pair of earphones, or an indication of either or both the distance between the two stations or the direction of the other station from the one station. This means comprises a receiver system 26, hereinafter designated for convenience as a "responser," which is shown as of the type for providing an indication of both the distance and the direction of the transpondor 19 from the interrogator 10 and responser 26. For this purpose, the responser 26 includes a pair of directive antenna systems 27, 28 having slightly overlapping directional characteristics in a horizontal plane but little directivity in vertical planes. These antenna systems are coupled to individual input circuits of a lobe switch 29 having a common output circuit coupled to an input circuit of a receiver 30. The modulation signal developed in the output circuit of the unit 12 is applied to a gain-control circuit of the receiver 30 for a purpose presently to be explained. The output circuit of the receiver 30 is coupled through an amplifier and phase inverter 31 to a pair of horizontal deflecting electrodes, designated as H, provided in a cathode-ray tube 32. The output circuit of the receiver 30 may also be coupled to a pair of earphones P if desired to provide audible indications that one or more reply wave signals are being received. The responser 26 also includes a scanning-signal generator 33 having an output circuit coupled to a pair of vertical deflecting electrodes, designated as V, provided in the cathode-ray tube 32. A synchronizing-signal circuit of the generator 33 is coupled to an output circuit of the generator 11 to be synchronized in operation by the pulse signal generated by the latter. The responser 26 also includes a lobe-switch generator 34 having an output circuit coupled to a control circuit of the lobe switch 29 and to a control circuit of unit 31.

Considering now the operation of the communication system just described, and referring to the curves of Fig. 2, the pulse generator 11 generates a signal of periodic-pulse wave form, as represented by curve A, and applies a pulse of this signal at time $t_0$ to the paired-pulse generator 12. The detailed operation of the latter will be considered hereinafter, but it may be stated for purposes of the present description that the generator 12 operates to generate a signal of pulse wave form having repeated pairs of pulses, as represented by curve B, of which each pair of pulses has a spacing $a$ between the leading edges thereof varying with the control action provided by the altimeter 13. The latter may for convenience be considered a barometer which provides a control action the magnitude of which varies with the ambient barometric pressure. Assuming that the interrogator 10 and responser 26 are carried by an aircraft, the control action provided by the altimeter 13 and the corresponding spacing $a$ between the paired pulses of the signal generated by generator 12 varies with the altitude of the aircraft. This signal of the generator 12 is applied to the modulation input circuit of the wave-signal generator 15 to modulate the wave signal generated by the latter. The modulated wave signal is radiated by the antenna system 16.

The transmitted wave signal of the interrogator 10 is received by the receiver 17 of the distant transpondor 19 and the pulse-modulation components thereof are derived by the receiver and applied with negative polarity, as represented by curve C, to the input circuit of the decoder 20. The operation of the decoder 20 will be considered in detail hereinafter, but for purposes of the present description it may be stated that it has an operation initiated in time relationship with the occurrence at time $t_1$ of the leading edge of the first pulse of each derived pair of pulses. The operation of the decoder 20 is so controlled by the altimeter 21 that the decoder generates and applies to a signal-translating stage included in the decoder a signal of pulse wave form, as represented by curve D, having a leading edge occurring an interval $t_2$ after the decoder 20 is initiated in operation. The interval $t_2$ varies with the magnitude of the control action provided by the altimeter 21. Assuming that the transponder 19 is carried by an aircraft, the altimeter 21 may be simply a barometer so that the time interval $t_2$ has a value varying with the altitude of the aircraft. The signal-translating stage included in the decoder 20 is arranged to translate to the reply-signal generator 22 the second pulse of each pair derived in the output circuit of the receiver 17, but is so biased that the stage translates such pulses only when there is applied thereto a pulse of the signal generated by the decoder 20, such as the pulse represented by curve D. The signal-translating stage is thus conditioned to translate a signal during the time interval $t_3$ and, hence, is conditioned to translate to the generator 22 the second pulse of each pair derived in the output circuit of the receiver 17 if the pulse spacing $a$ corresponds approximately to the time interval $t_2$. This would occur, under the assumed conditions, when the altimeter 13 of the interrogator 10 is at the same altitude as the altimeter 21 of the transpondor 19. Assuming that the second pulse of each derived pair is translated by the decoder 20, there is applied to the reply-signal generator 22 a signal of pulse wave form as represented by curve E. Each pulse of this applied signal initiates the generation of a corresponding pulse or group of pulses of a reply signal. The particular wave form of the reply signal, for example, the number, durations and spacings of grouped pulses thereof, adequately identifies the aircraft which carries the transpondor 19 or the bearing of such aircraft, or both. This signal, represented by curve F, is applied through the amplifier 23 to the modulation input circuit of the wave-signal generator 24 to modulate the wave signal by the latter. The modulated wave signal is radiated by the antenna 25 as a reply-modulated wave signal. The reply signal of generator 22 is also applied to a gain-control circuit of the receiver 17 to de-energize the latter during the radiation of each pulse from the antenna 25. This ensures that transpondor 19 shall not reply to its own transmissions.

Before continuing with the description of the system operation, one further phase of operation of the decoder 20 might advantageously be considered at this point. Thus, assume that the operation of the decoder 20, under control of the altimeter 21, is such that the leading edge of each pulse of the signal generated thereby occurs with a time interval $t_2'$ or $t_2''$ after the initiation of operation of the decoder at time $t_1$. This signal then has the wave form represented by one of the broken-line curves D' or D''. It is at once apparent that the second pulse of each pair of pulses derived in the output circuit of the receiver 17 is not then translated by the translating stage of the decoder 20 since the stage is not properly conditioned to translate during the occurrence of the second pulse. No reply wave signal is consequently transmitted by the transpondor 19. Such a condition would occur, for example, when the aircraft carrying the transpondor 19 is at an altitude either above or below that of the aircraft which carries the interrogator 10.

The reply wave signal of the transpondor 19 is received by the antenna systems 27 and 28 of the responser 26 and is applied to the lobe switch 29. The lobe-switch generator 34 generates a signal which so controls the lobe switch 29 that the antenna systems 27 and 28 are alternately connected to the input circuit of the receiver 30. Since the antenna systems 27 and 28 are directive, the intensity of the wave signal received by the antenna 27 is the same as that received by the antenna 28 only when the transpondor 19 is carried by a craft which is positioned directly ahead of the antenna systems 27 and 28. The antenna systems 27 and 28 also receive, of course, at least a small quantity of the transmitted wave-signal energy directly coupled thereto from the antenna 16 of the interrogator 10. While this energy is likewise applied through the lobe switch 29 to the receiver 30, there is applied at the same time to a gain-control circuit of the receiver the modulation signal developed in the output circuit of the paired-pulse generator 12 of the interrogator. This modulation signal so controls the gain of the receiver 30 that the latter does not translate the wave-signal energy directly received by the antenna systems 27 and 28 from the interrogator antenna 16, thus to prevent possible paralysis of the receiver by the directly received energy of the interrogator transmissions. The receiver 30 derives the modulation components of the received wave signal and applies them through the amplifier and phase inverter 31 to the horizontal deflecting electrodes H of the cathode-ray tube 32. The signal generated by the lobe-switch generator 34 so controls the unit 31 that these modulation components are applied alternately to the tube 32 with direct phase and inverted phase in synchronism with the alternate connection of the antenna systems 27 and 28 to the receiver 30. Consequently, one polarity of the modulation signal applied to tube 32 corresponds to reception by the antenna system 27 while the inverted phase of the applied modulation signal corresponds to reception by the antenna system 28. By rotating the antenna systems 27 and 28 until the modulation components of direct and inverted phases have equal amplitudes, the azimuth of the replying transpondor may be readily ascertained. There is also applied to the vertical deflecting electrodes V of tube 32 a scanning potential of saw-tooth wave form generated by the scanning-signal generator 33 the operation of which is synchronized by the signal generated by the generator 11. The periodicity of this scanning potential is thus the same as that of the signal of generator 11, but the duration of the saw-tooth component during each cycle thereof generally is much shorter than the period of the scanning potential and has a value dependent upon the desired maximum distance range of operation of the communication system. The scanning signal applied to the vertical deflecting electrodes of tube 32 produces a vertical scanning movement of the electron beam of this tube while the modulation components applied to the horizontal deflecting electrodes of the tube produce a horizontal deflection of the beam, thereby to provide the desired indication.

An illustrative indication provided by the cathode-ray tube 32 is shown in Fig. 3 wherein it is assumed that the initiation of each vertical trace is at the bottom margin of the fluorescent screen. A first reply pulse P occurs a distance $d$ from the initiation of the vertical trace and is positioned asymmetrically with relation to the trace. The pulse P thus provides an indication that the replying transpondor is positioned a distance $d$ in miles from the interrogator-responser unit and, further, that it lies to one side of the plane of symmetry of the directional characteristics of the antenna systems 27 and 28 of the responser. The duration of pulse P may provide an indication of the identity of the aircraft which carries the replying transpondor or, alternatively, may indicate that the aircraft is flying in a direction included within a predetermined compass quadrant. There is also shown in Fig. 3 a pair of reply pulses P' positioned a distance $d_1$ from the initiation of the vertical trace and symmetrical with respect thereto. This indicates that a second replying transpondor is located a distance $d_1$ in miles from the interrogator-responser and lies directly ahead of the antenna systems 27 and 28, the grouping of a relatively long pulse followed by a relatively short pulse indicating aircraft identity or its direction of flight.

In practice, it is preferable that the wave signal generated by the generator 15 of the interrogator 10 and received by the receiver 17 of the transpondor 19 have a frequency different from that generated by the generator 24 of the transpondor and received by the receiver 30 of the responser 26. The use of different transmission frequencies in this manner has the advantage that the receiver 30 of the responser 26 does not receive pulses of wave-signal energy transmitted by the interrogator 10 and reflected from such fixed or mobile objects as are capable of reflecting wave-signal energy. Such reflected pulses, if received, would be disturbing to the pilot of an aircraft even though they were readily distinguishable from the desired replies of distant transpondors.

When the system of the present invention is used as an aircraft navigation and traffic-control system, it is preferable that the altimeter 13 of the interrogator 10 and the altimeter 21 of the transpondor 19 be adjusted and sealed at the factory to read absolute height above sea level at normal barometric pressure. This ensures that all aircraft react identically and thus that aircraft flying at the same height on a given day will be similarly altitude-coded regardless of current barometric conditions.

While it is assumed in the foregoing description of the system operation that the interrogator-responser unit and the transpondor unit were each carried by individual aircraft, it will be apparent that either the interrogator-responser unit or the transpondor unit may be terrestrially located. Where this is done, a fixed altitude difference is provided between the control of the altimeter and the unit controlled thereby, in a manner more fully explained hereinafter, by which the terrestrially located unit of the system may operate with an artificially injected altitude compensation which takes into account the difference in elevation between the terrestrial location at the point of installation and the air traffic zone used by aircraft with which it is desired to communicate.

It will also be apparent from the foregoing description of the invention that the paired-pulse generator 12 of the interrogator 10 and the decoder 20 of the transpondor 19 operate effectively as an altitude-controlled delay circuit responsive to a first pulse applied thereto to generate or provide a second pulse delayed in point of time with relation to the first pulse.

Of the signal generated by the generator 12 of the interrogator 10, as represented by curve B of Fig. 2, it will be apparent that the leading edges of the successive pulses of each pair thereof comprise at least two relatively variable wave-form portions designating by their relative amount of variation, that is by their relative spacing, an individual one of a plurality of traffic zones available to mobile objects. Similarly, the signal derived in the output circuit of the receiver 17, and represented by curve C of Fig. 2, has a waveform corresponding to that of the signal last mentioned and consequently also includes two relatively variable wave-form portions, namely, the leading edges of successive pulses of each pair, which vary with those of the modulation signal generated by unit 12 and consequently establish by their relative amount of variation a particular one of the plurality of traffic zones.

The circuit arrangement of the paired-pulse generator 12 of the interrogator 10 may be as shown in Fig. 4 wherein elements corresponding to similar elements of Fig. 1 are identified by similar reference numerals. The paired-pulse generator broadly comprises a univibrator 36, a pulse former 37, a polarity inverter 38, and a combining amplifier 35. The univibrator is sometimes referred to in the art as a "one-shot multivibrator," that is a relaxation oscillator normally having a stable operating condition but which may have an unstable operating condition initiated by the application of a control pulse and terminated by the discharge of a condenser in a time-constant network in the oscillator circuit. The polarity inverter 38 has an input circuit coupled to an output circuit of the pulse generator 11 and has an output circuit coupled to an input circuit of the amplifier 35. The univibrator 36 includes a triode vacuum tube 39 having input electrodes coupled to the output circuit of the pulse generator 11 and having output electrodes coupled to the input electrodes of a second triode vacuum tube 40. Connected between the control electrode and cathode of the vacuum tube 39 is an adjustable resistor 41 having a movable contact 42 which is pivoted at 43 and is mechanically connected to the altimeter 13, shown as an aneroid barometer, for controlled adjustment thereby. The cathode circuits of the vacuum tubes 39 and 40 include a common cathode resistor 44. The output electrodes of the vacuum tube 40 are coupled to the input electrodes of the vacuum tube 39 through a small condenser 45. A switch 46 is provided, for a purpose presently to be explained, selectively to connect the control electrode of tube 39 to the cathode of the latter either through the resistor 41 or through a manually adjustable resistor 47. A manually adjustable control 48 is provided to rotate the resistive element 41 relative to its contact 42 for a purpose presently to be described.

The pulse former 37 includes a vacuum tube 50 having input electrodes coupled through a condenser 51 and through the condenser 45 to the output electrodes of the vacuum tube 40 of the univibrator 36. The control electrode of vacuum tube 50 is so biased through a resistor 49 from a source of negative potential, indicated as $-C$, as to render the tube 50 normally nonconductive. The anode of the tube 50 is coupled through a primary winding 52 of a transformer 53 to a source of potential, indicated as $+B$. The pulse former 37 includes a second vacuum tube 54 having output electrodes coupled in parallel with the output electrodes of tube 50 and having a control electrode biased from a negative potential source, indicated as $-C_1$, through a resistor 55 and a secondary winding 56 of the transformer 53. A conventional delay line 57 is coupled across the resistor 55. The pulse former 37 includes a third vacuum tube 58 having a control electrode biased from a negative potential source, indicated as $-C_3$, through a tertiary winding 59 of the transformer 53. The output load impedance of the vacuum tube 58 comprises a cathode resistor 60. The latter is coupled to an input circuit of the amplifier 35.

Considering now the operation of the paired-pulse generator just described, and referring to the curves of Fig. 5, one pulse of the signal of pulse waveform generated by the pulse generator 11 is represented by curve G. The pulses of this signal are applied to the paired-pulse generator with negative polarity as indicated. This signal is applied to the polarity inverter 38 which inverts the polarity of the pulses and applies a signal having positive polarity pulses to an input circuit of the amplifier 35. The signal of the generator 11 is also applied to the input electrodes of the vacuum tube 39 of the univibrator 33. The control electrode of this tube normally has little or no bias with respect to its associated cathode so that the tube 39 is normally conductive. The space current of the tube 39 flows through its cathode resistor 44 to develop thereacross a potential of sufficient magnitude to maintain the vacuum tube 40 normally biased to anode-current cutoff.

When a negative pulse of the signal of generator 11 is applied to the input electrodes of vacuum tube 39, it reduces the anode current of this tube thereby applying from the output circuit of tube 39 to the control electrode of vacuum tube 40 a potential sufficiently positive to initiate anode-current flow in the latter tube. This in turn applies a negative potential through the condenser 45 to the control electrode of vacuum tube 39 further to reduce the anode current of the latter. This action is cumulative and the vacuum tube 39 is rapidly driven to anode-current cutoff while the vacuum tube 40 quickly reaches a condition of full conductivity. The voltage applied to the control electrode of the vacuum tube 39 begins to go more positive as the condenser 45 discharges through a circuit which includes the resistor 41 and the anode-cathode space of tube 40. A value of bias is eventually reached after a certain time interval which permits anode-current flow to be initiated in tube 39. When this occurs, a negative potential is applied from the output circuit of tube 39 to the control electrode of the tube 40, thereby to decrease the anode current of the latter. This in turn applies a positive potential from the output circuit of tube 40 to the control electrode of tube 39 further increasing the anode current of the latter. This action is again cumulative until vacuum tube 40 is rapidly driven to anode-current cutoff and vacuum tube 39 quickly reaches a state of full conductivity.

The anode potential of the tube 40 during the cycle of operation described is represented in Fig. 5 by curve H. It will be apparent that this potential variation is of pulse wave form having a pulse duration dependent upon the rapidity with which the condenser 45 discharges through the resistor 41. This pulse interval is therefore adjustable by adjustment of the value of the resistor 41. The latter, however, has a value of resistance controlled by the altimeter 13 and thus a value of resistance varying with the ambient barometric pressure. From this it will be apparent that the duration of each pulse of the potential developed in the output circuit of the vacuum tube 40 has a duration controlled by the altimeter 13.

This potential is applied through the condenser 51 to the input electrodes of the vacuum tube 50. The condenser 51 and the grid resistor 49 of the tube 50 differentiate the applied potential pulse to develop a potential of pulse wave form, represented by curve I, having a negative polarity pulse followed by a positive polarity pulse corresponding respectively to the leading and lagging edges of the applied potential pulse. The vacuum tube 50 is normally biased to anode-current cutoff from the source of potential $-C$ so that the negative polarity pulse has no effect on the operation of this tube. The positive polarity pulse, however, initiates anode-current flow in the tube 50 and this current in flowing through the primary winding 52 of the transformer 53 induces a voltage in the secondary winding 58 thereof. This induced voltage is applied with positive polarity to the control electrode of the vacuum tube 54 to initiate anode-current flow through the latter. The control electrode of tube 54 becomes sufficiently positive that it draws current to develop across the resistor 55 a negative impulse which is applied to the input terminals of the delay line 57. The vacuum tube 50 ceases to pass current at the end of the positive potential pulse applied to its control electrode, but the transformer 53 has sufficient inductance that the anode current of tube 54 cannot rise to its maximum value for a short time interval. At about the end of this interval, the impulse which earlier was applied to the delay line 57 has traveled to the end of the line and is reflected without reversal of polarity to the input terminals thereof where it is applied to the control electrode of vacuum tube 54 to bias this tube to anode-current cutoff. The interval during which anode-current flows in the vacuum tube 54 is thus determined by the interval required for an impulse to travel down the delay line 57 and to return by reflection to its input terminals. A desired value of time delay can be provided by a suitable choice of the values of the circuit components of the delay line 57 in well-known manner. The operation described requires that the reflected impulse have the same polarity as the impulse applied to the input terminals of delay line 57. For this purpose, the remote end of the delay line is open-circuited.

The anode currents of the tubes 50 and 54 in flowing through the primary winding 52 of the transformer 53 induces in the tertiary winding 59 thereof a potential of pulse wave form, represented by curve K of Fig. 5. It will be apparent that the duration of each pulse of this potential has a value determined by the value of delay provided by the delay line 57. This potential is applied with positive polarity to the input electrodes of the vacuum tube 58, which is normally biased to anode-current cutoff from the source of bias potential $-C_3$, and each pulse thereof initiates anode-current flow in this tube. There is thus developed across the cathode resistor 60 of this tube a potential of pulse wave form, represented by curve L, and this potential is applied to an input circuit of the amplifier 35.

Consequently, there is applied to the amplifier 35 at time $t_0$, Fig. 5, a first pulse of positive polarity developed in the output circuit of the polarity inverter 38 and at time $t_a$ a second pulse of positive polarity developed across the cathode resistor 59. The composite signal applied to the amplifier thus has the wave form represented by curve B of Fig. 2.

It will be apparent from what has been said that the time interval $t_0-t_a$, and the resultant spacing $a$ between the pulses is established by the duration of the potential pulse developed in the output circuit of the vacuum tube 40 of the univibrator 36, this potential pulse being represented by curve H of Fig. 5. Since the latter potential pulse has a duration varying with the control action provided by the altimeter 13, as previously explained, it will be apparent that the time interval $t_0-t_a$ also is controlled by the altimeter 13. Consequently, there is applied to the amplifier 35 a signal of paired-pulse wave form of which each pair of pulses thereof has a variable spacing controlled by the altimeter 13.

It was previously mentioned that where the interrogator-responser units of the communication system are carried by an aircraft, occasion may arise where the pilot thereof desires to explore the adjacent altitude zone above or below the one in which he is then flying in order to ascertain whether, for example, it may be safe for him to increase or decrease his altitude to a position in the other zone. For this purpose, the Fig. 4 paired-pulse generator arrangement includes a manually operable switch 46 by which the control electrode of vacuum tube 39 may be connected to its associated cathode through the manually adjustable resistor 47. This permits the pilot manually to adjust the resistor 47 to a value such that the pulse duration of the potential developed in the output circuit of the vacuum tube 40 corresponds to that representative of the altitude zone he wishes to explore. The paired pulses generated by the paired-pulse generator then have a spacing characteristic of the new altitude zone and are thus effective to interrogate transpondors carried by aircraft in that zone.

Where the interrogator-responser units of the communication system are terrestrially located, it will be apparent that the barometric pressure at the altimeter thereof does not correspond to that for an aircraft flying at some altitude zone, for example, five thousand feet. To permit interrogation of such aircraft by the terrestrially located interrogator-responser units, the paired-pulse generator of the interrogator thereof includes, as shown in Fig. 4, a manual adjustment 48 by which the resistor 41 may be rotated relative to the contact 42 associated therewith thus to insert an artificial altitude compensation. The compensation, once inserted at a given installation, remains thereafter fixed during the life of the equipment and consistent communication is maintained with aircraft at the selected altitude zone without regard to varying barometric pressures in that locality.

The arrangement of the decoder 20 utilized in the transpondor 19 of the Fig. 1 arrangement is shown schematically in Fig. 6. This decoder utilizer a univibrator 36 and pulse former 37 as in the Fig. 4 arrangement and includes an amplifier 62 having an input circuit coupled to the output circuit of the receiver 17 and having an output circuit coupled to an input circuit of the reply-signal generator 22. The amplifier includes a gain-control circuit coupled to an output circuit of the pulse former 37. The univibrator 36 is controlled by the altimeter 21 in a manner similar to that shown in Fig. 4. In the decoder, the potential of positive polarity and of pulse wave form developed in the output circuit of the pulse former 37 preferably has a pulse duration a little longer than that of the second pulse of each pair developed in the output circuit of the receiver 17 and applied to the input circuit of the amplifier 62. The desired pulse duration is established, as explained, by selection of the values of the circuit components of the delay line included in the pulse former 37. The amplifier 62 is so biased and operated that it translates to its output circuit the signal applied to its input circuit only during each pulse of the potential applied to the amplifier gain-control circuit from the pulse former 37. Consequently, as explained in connection with Fig. 2, if each pulse of the potential applied to the gain-control circuit of the amplifier 62 from the pulse former 37 occurs with the proper time interval $t_2$ following the leading edge of the first pulse of each pair developed in the output circuit of the receiver 17, and represented by curve C of Fig. 2, the second pulse of each such pair is translated by the amplifier 62 to develop in the output circuit of the latter a potential of pulse wave form as represented by curve E of Fig. 2. The univibrator 36 of the decoder may have the manual adjustments, described in connection with Fig. 4, by which the transpondor may be enabled to respond to manually selected altitude zones, or by which the transpondor when terrestrially located may be provided with an artificial altitude compensation.

Figure 7:
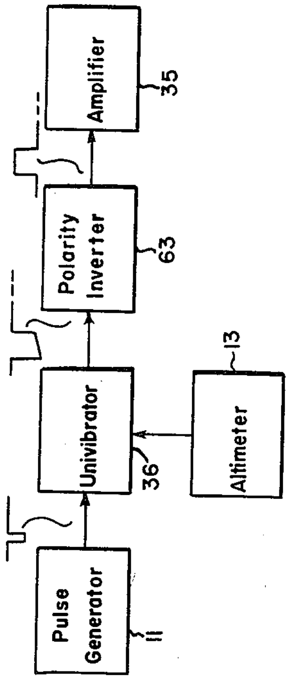

Fig. 7 represents schematically a portion of an interrogator embodying a modified form of the invention which is essentially similar to that of Fig. 1, similar elements being designated by similar reference numerals. The paired-pulse generator 12 of the Fig. 1 arrangement is replaced in the present interrogator by a univibrator 36, similar to the univibrator 36 of the Fig. 4 arrangement, and a polarity inverter 63 which are coupled in tandem between the pulse generator 11 and the amplifier 35. As explained in connection with Fig. 4, the univibrator 36 develops a potential of pulse wave form the duration of each pulse of which is controlled by the altimeter 13. Consequently, this potential may have its polarity inverted by the unit 63 for application as a modulation signal to the amplifier 35. In this modification, the carrier wave transmitted by the interrogator is thus modulated by a signal of pulse wave form, each pulse of which has two relatively variable wave-form portions designating by their relative amount of variation under control of the altimeter 13 an individual one of a plurality of traffic zones available to mobile objects. The two relatively variable waveform portions of this modulation signal are, of course, the leading and lagging edges of each pulse thereof, the spacing between the leading and lagging edges of each pulse being controlled by the altimeter 13 thus to designate an individual altitude traffic zone.

Figure 8:
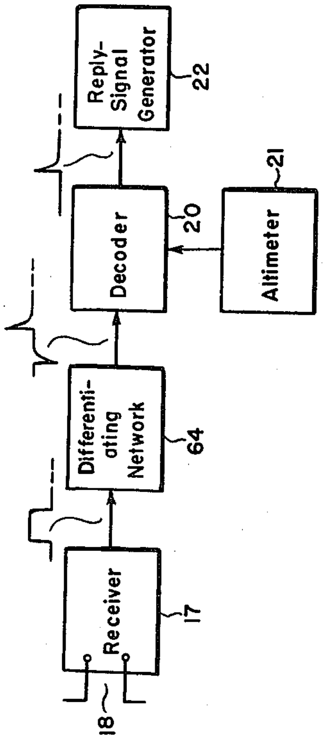

Fig. 8 represents a portion of a transpondor suitable for use with an interrogator embodying the Fig. 7 modified form of the invention. Elements in Fig. 8 corresponding to similar elements of Fig. 1 are designated by similar reference numerals. In the present arrangement, there is derived in the output circuit of the receiver 17 from a received modulated wave signal a signal of pulse wave form, each pulse of which has a variable pulse duration as established by the altitude control of the interrogator which transmitted the wave signal. This derived signal is applied to a differentiating network 64 which derives for each such pulse a negative and a positive polarity pulse corresponding respectively to the leading and lagging edges of each applied pulse, the operation in this regard being similar to that described above in connection with curves H and I of Fig. 5. This pulse signal derived by differentiation is applied to the decoder 20 which translates the second positive polarity pulses thereof if each pair of such pulses has a spacing corresponding to that established by the altimeter 21, the operation in this respect being essentially similar to that described in connection with Fig. 6.

Figure 9:
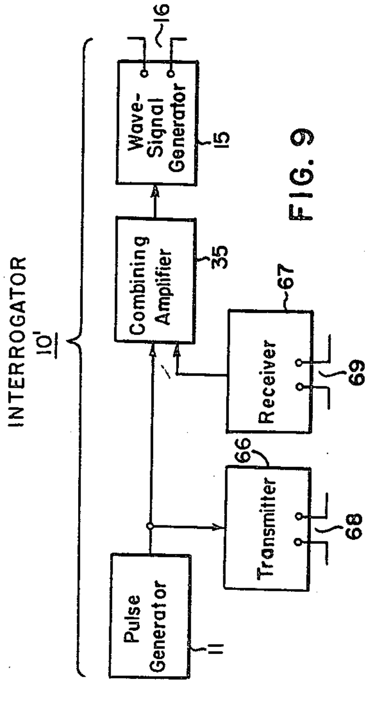

Fig. 9 represents schematically a complete interrogator 10' embodying an additionally modified form of the invention essentially similar to the Fig. 1 arrangement, elements of Fig. 9 corresponding to similar elements of Fig. 1 being designated by similar reference numerals. In the present arrangement, the paired-pulse generator and altimeter of the interrogator are comprised by a transmitter 66 and a receiver 67. The signal generated by the generator 11 is applied to the amplifier 35 and also to a modulation circuit of the transmitter 66 to modulate the wave signal generated by the latter. This modulated wave signal is radiated by an antenna 68 provided for the transmitter 66, the antenna 68 having a directive characteristic directed downwardly toward the ground. The units 66 and 67 essentially comprise a radio altimeter and wave-signal pulses reflected from the ground are received by a receiving antenna 69 provided for the receiver 67. The modulation components of the received wave signal are derived and applied to the amplifier 35. There is consequently applied to the latter from the pulse generator 11 and the receiver 67 a composite signal of pulse wave form having paired pulses. Each pair of pulses of this composite signal has a variable spacing dependent upon the time interval required for a pulse of wave-signal energy to travel from the antenna 68 to the ground and to return to the antenna 69, and thus a spacing varying with the altitude of the units 66 and 67 with relation to the ground.

Figure 10:
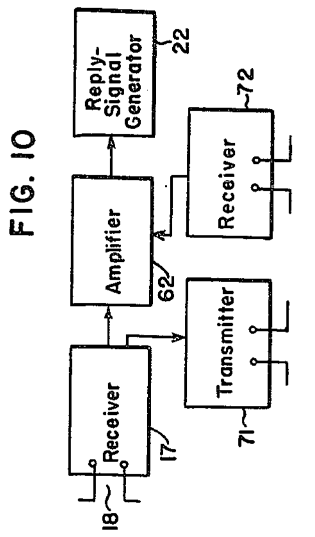

Fig. 10 represents a portion of a transpondor suitable for use with the interrogator of Fig. 9 and utilizing a similar radio altimeter. The modulation signal developed in the output circuit of the receiver 17 is applied to a modulation circuit of a transmitter 71 which transmits a pulse-modulated wave signal directed toward the ground. Pulses of wave-signal energy reflected from the ground are received by a receiver 72 and the modulation components thereof are applied as control potential pulses to the control circuit of the amplifier 62. These control potential pulses condition the amplifier to translate during each pulse thereof the signal applied to the amplifier from the receiver 17. The operation of the amplifier 62 in this regard is essentially similar to that of the amplifier 62 of the Fig. 6 arrangement. The use of a radio altimeter in an interrogator, as in Fig. 9, and in a transpondor, as in Fig. 10, is preferable only under conditions where the ground surface has no severe undulations, as over flat country or over the surface of the ocean. The reasons for this are apparent when it is considered that the altitude control of the interrogator and responser should be uniform with altitude and without regard to the surface of the terrain over which two widely spaced intercommunicating aircraft may be flying at a given moment.

Figure 11:
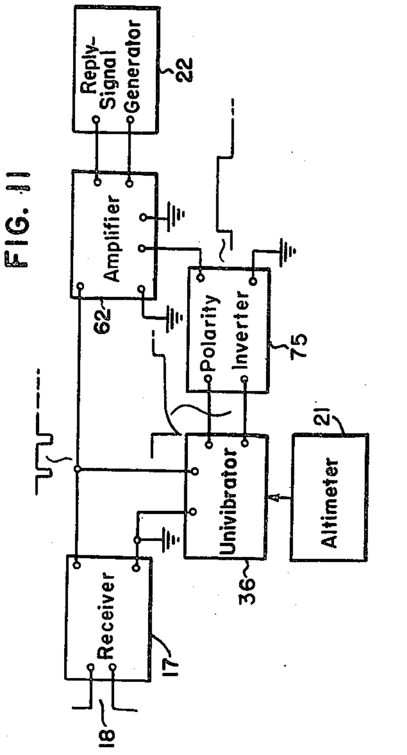

Fig. 11 represents schematically a portion of a transpondor suitable for use in an aircraft navigation system embodying the present invention to provide indications of the presence of an obstacle with which aircraft in flight may collide. Such obstacle indications may, for example, be furnished for tall buildings in a city, for broadcast antenna towers, or for mountain peaks. This arrangement is essentially similar to that of Fig. 6, similar elements being designated by similar reference numerals, except that the pulse former used in Fig. 6 is replaced in the instant arrangement by a polarity inverter 75 which has an input circuit coupled to the output circuit of the univibrator 36 and has an output circuit coupled to a control circuit of the amplifier 62. Additionally, in the present arrangement the univibrator 36 has a pulse duration corresponding to the altitude of the highest point of the obstacle. Thus, when the potential of pulse wave form generated by the univibrator 36 is reversed in polarity by the unit 75 and applied to the control circuit of the amplifier 62, the amplifier is enabled to translate all signals applied thereto from the receiver 17 which have a value of separation between the pulses of each pair thereof corresponding to any altitude less than that represented by the duration of each pulse of the univibrator 36. A signal having a paired-pulse spacing greater than this value, and corresponding to a higher altitude, does not fall within the range of altitude values established by the pulses generated by the univibrator 36 and, consequently, is not translated by the amplifier 62. This only means, of course, that an aircraft transmitting an interrogating signal with this wider paired-pulse spacing is at a higher altitude than the obstacle and may pass safely over it so that no obstacle indication should be furnished to such aircraft.

It will be apparent from the foregoing description of the invention that a wave-signal communication system embodying the invention has a wide range of application in traffic-control systems and particularly in the navigation and traffic control of aircraft. When used with aircraft, it materially aids in the navigation of aircraft along a prescribed course while providing positive indications of all such hazardous conditions as may result in the collision of two aircraft in flight or the collision of an aircraft with an obstacle. The system of the invention permits the progress of an aircraft along a prescribed course to be readily followed by a traffic-control center and enables positive identification at the center of such aircraft. Additionally, the communication system of the invention has the advantage that it permits positive and safe altitude separation of aircraft so that prescribed courses may be safely followed by large numbers of aircraft even though a plurality of such courses cross one another or converge into one or more altitude zones.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for communication between two spaced wave-signal stations at least one of which is carried by a mobile object comprising: a first altitude-re ponsive device at one of said stations for developing a first control effect representative of altitude; means at said one station responsive to said control effect for transmitting wave-signal energy modulated by signal energy of pulse wave form having at least two relatively variable edge portions designating by their relative amount of variation an individual one of a plurality of vertically positioned traffic zones available to mobile objects; means at the other of said stations for receiving said modulated wave-signal energy and for deriving in response thereto signal energy having two relatively variable edge portions related to those of said modulation signal energy; a second device at said other station for developing a second control effect representative of its altitude; and control means at said other station responsive to said second control effect for utilizing said derived signal energy only when said edge portions thereof have a relative amount of variation lying within a selectable range of values automatically established by said control means under control of said second altitude-representative device as designating a selectable one of said plurality of traffic zones.

2. A system for communication between two spaced wave-signal stations at least one of which is carried by a mobile object comprising: a first barometer for providing a control action varying with barometric pressure, means at one of said stations and including said first barometer for transmitting wave-signal energy modulated by signal energy of pulse wave form having under control of said barometer at least two relatively variable edge portions automatically designating by their relative amount of variation an individual one of a plurality of vertically positioned traffic zones available to mobile objects; means at the other of said stations for receiving said modulated wave-signal energy and for deriving in response thereto signal energy having two relatively variable edge portions varying with those of said modulation-signal energy; a second barometer for providing a control action varying with barometric pressure; and means including said second barometer and a control means at said other station having a cycle of operation initiated in a predetermined time relationship with the occurrence of one of said edge portions of said derived signal energy for utilizing said derived signal energy only when the other of said edge portions thereof has a relative amount of variation lying within a selectable range of values automatically established by said control means under control of said second barometer as designating a selectable one of said plurality of vertically positioned traffic zones.

3. A system for communication between two spaced wave-signal stations at least one of which is carried by a mobile object comprising: means including an altitude-responsive device at one of said stations for transmitting wave-signal energy modulated by signal energy of pulse wave form having at least two relatively variable edge portions designating by their relative amount of variation an individual one of a plurality of altitude traffic zones available to mobile objects; means at the other of said stations for receiving said modulated wave-signal energy and for deriving in response thereto signal energy having two relatively variable edge portions related to those of said modulation-signal energy; means including a control means at said other station responsive to one of said edge portions of said derived signal energy for transmitting a reply-modulated wave signal in response to said derived signal energy only when the other of said edge portions thereof has a relative amount of variation lying within a selectable range of values established by said control means as designating a selectable one of said plurality of traffic zones; means at said one station for receiving said transmitted reply wave signal and for deriving the modulation components thereof; and means for utilizing said derived modulation components to indicate the distance between said stations.

4. A system for communication between two spaced wave-signal stations at least one of which is carried by a mobile object comprising: means including an altitude-responsive device at one of said stations for transmitting wave-signal energy modulated by signal energy of pulse wave form having at least two relatively variable edge portions designating by their relative amount of variation an individual one of a plurality of altitude traffic zones available to mobile objects; means at the other of said stations for receiving said modulated wave-signal energy and for deriving in response thereto signal energy having two relatively variable edge portions related to those of said modulation-signal energy; means including a control means at said other station responsive to one of said edge portions of said derived signal energy for transmitting a reply-modulated wave signal in response to said derived signal energy only when the other of said edge portions thereof has a relative amount of variation lying within a selectable range of values established by said control means as designating a selectable one of said plurality of traffic zones; means at said one station for receiving said transmitted reply wave signal and for deriving the modulation components thereof; and means for utilizing said derived modulation components to indicate the distance between said stations and the direction of said one station from said other station.

5. A system for communication between two spaced wave-signal stations at least one of which is carried by a mobile object comprising: means including an altitude-responsive device at one of said stations for transmitting wave-signal energy modulated by signal energy of pulse wave form having the leading edges of two successive pulses thereof variably spaced to designate by their relative amount of spacing an individual one of a plurality of altitude traffic zones available to mobile objects; means at the other of said stations for receiving said modulated wave-signal energy and for deriving in response thereto signal energy having a pulse wave form corresponding to that of said modulation-signal energy and including two variably spaced successive pulses; means including a control means at said other station responsive to the leading edge of one of said pulses of said derived signal energy for transmitting a reply-modulated wave signal in response to said derived signal energy only when the leading edge of the other of said pulses thereof has a relative amount of spacing lying within a selectable range of values established by said control means as desigating a selectable one of said plurality of traffic zones; and means at said one station for receiving said transmitted reply wave signal and for utilizing the modulation components thereof to provide at least an indication that a reply wave signal has been received.

6. A system for communication between two spaced wave-signal stations at least one of which is carried by a mobile object comprising: means at one of said stations, including a device for developing an effect representative of altitude, responsive to said effect for transmitting wave-signal energy modulated by signal energy of pulse wave form having at least two relatively variable edge portions designating by their relative amount of variation an individual one of a plurality of altitude traffic zones available to mobile objects; means at the other of said stations for receiving said modulated wave-signal energy and for deriving in response thereto signal energy having two relatively variable edge portions related to those of said modulation-signal energy; means including a control means at said other station for transmitting a reply-modulated wave signal in response to said derived signal energy only when said edge portions thereof have a relative amount of variation lying within a selectable range of values established by said control means as designating a selectable one of said plurality of altitude traffic zones; and means at said one station for receiving said transmitted reply wave signal and for utilizing the modulation components thereof to provide at least an indication that a reply wave signal has been received.

7. A system for communication between two spaced wave-signal stations at least one of which is carried by a mobile object comprising: a first device at one of said stations for developing a first control effect representative of altitude; means at said one of said stations responsive to said control effect for transmitting wave-signal energy modulated by signal energy of pulse wave form having at least two relatively variable edge portions designating by their relative amount of variation an individual one of a plurality of altitude traffic zones available to mobile objects; means at the other of said stations for receiving said modulated wave-signal energy and for deriving in response thereto signal energy having two relatively variable edge portions related to those of said modulation-signal energy; a second device at said other station for developing a second control effect representative of its altitude; control means at said other station responsive to said second control effect for utilizing said derived signal energy only when the said edge portions thereof have a relative amount of variation lying within a selectable range of values automatically established by said control means under control of said second altitude-representative device as automatically designating a selectable one of said plurality of altitude traffic zones; and means at said one station for receiving said transmitted reply wave signal and for utilizing the modulation components thereof to provide at least an indication that a reply wave signal has been received.

8. A system for communication between two spaced wave-signal stations at least one of which is carried by a mobile object comprising: a first device at one of said stations for developing a first control effect representative of altitude; means at said one station responsive to said control effect for transmitting wave-signal energy modulated by signal energy of pulse wave form having the leading edges of two successive pulses thereof variably spaced to designate by their relative amount of spacing an individual one of a plurality of vertically positioned altitude traffic zones available to mobile objects; means at the other of said stations for receiving said modulated wave-signal energy and for deriving in response thereto signal energy having a pulse wave form corresponding to that of said modulation-signal energy and including two variably spaced successive pulses; a second device at said other station for developing a second control effect representative of its altitude; control means at said other station responsive to said second control effect and to the leading edge of the first of said pulses of said derived signal energy for utilizing the second of said two successive pulses of said derived signal energy for initiating the transmission of a reply-modulated wave signal only when the leading edge of the second of said pulses of said derived signal energy has a relative amount of spacing lying within a selectable range of values established by said control means under control of said second altitude-representative device as automatically designating a selectable one of said plurality of traffic zones; and means at said one station for receiving said transmitted reply wave signal and for utilizing the modulation components thereof to provide at least an indication that a reply wave signal has been received.

9. A system for communication between two spaced wave-signal stations at least one of which is carried by a mobile object comprising: means including an altitude-responsive device at one of said stations for transmitting wave-signal energy modulated by signal energy of pulse wave form having the leading edges of two successive pulses thereof variably spaced under control of said device automatically to designate by their relative amount of spacing an individual one of a plurality of altitude traffic zones available to mobile objects; means at the other of said stations for receiving said modulated wave-signal energy and for deriving in response thereto signal energy having a pulse wave form corresponding to that of said modulation-signal energy including said two variably spaced successive pulses; means including a second altitude-responsive device and a control means at said other station having a cycle of operation initiated in a predetermined time relationship with the leading edge of the first of said pulses of said derived signal energy for utilizing the second of said two derived successive pulses for initiating the transmission of a reply-modulated wave signal only when the leading edge of the second of said derived pulses has a relative amount of spacing lying within a selectable range of values established by said control means under control of said second altitude-responsive device as automatically designating a selectable one of said plurality of altitude traffic zones; and means at said one station for receiving said transmitted reply wave signal and for utilizing the modulation components thereof to provide at least an indication that a reply wave signal has been received.

10. In a system for communication between two spaced wave-signal stations at least one of which is carried by a mobile object, a wave-signal receiver comprising: means for receiving wave-signal energy modulated by signal energy of pulse wave form having at least two relatively variable edge portions designating by their relative amount of variation an individual one of a plurality of traffic zones available to mobile objects; means responsive to said received wave-signal energy for deriving signal energy of pulse wave form corresponding to said modulation-signal energy and including said two variable edge portions; and means including a univibrator having a cycle of operation initiated in a predetermined time relationship with the occurrence of one of said edge portions of said derived signal energy for utilizing said derived signal energy only when the other of said edge portions thereof has a relative amount of variation lying within a selectable range of values established by said univibrator as selectively designating at least one of said plurality of traffic zones.

11. In a system for communication between two spaced wave-signal stations at least one of which is carried by a mobile object, a wave-signal receiver comprising: means for receiving wave-signal energy modulated by signal energy of pulse wave form having at least two relatively variable edge portions designating by their relative amount of variation an individual one of a plurality of altitude traffic zones available to mobile objects; means responsive to said received wave-signal energy for deriving signal energy having two relatively variable edge portions related to those of said modulation-signal energy; and means including an altitude-responsive device and including a univibrator having a cycle of operation initiated in a predetermined time relationship with the occurrence of one of said edge portions of said derived signal energy for utilizing said derived signal energy only when the other of said edge portions thereof has a relative amount of variation lying within a selectable range of values established by said univibrator under control of said altitude-responsive device as selectively and automatically designating at least one of said plurality of altitude traffic zones.

12. In a system for communication between two spaced wave-signal stations at least one of which is carried by a mobile object, a wave-signal receiver comprising: means for receiving wave-signal energy modulated by signal energy of pulse wave form having the leading edges of two successive pulses thereof variably spaced to designate by their relative spacing an individual one of a plurality of altitude traffic zones available to mobile objects; means responsive to said received wave-signal energy for deriving signal energy having a pulse wave form corresponding to that of said modulation-signal energy and including said variable spacing between the leading edges of two successive pulses thereof; and means including an altitude-responsive device and a univibrator having a cycle of operation initiated in a predetermined time relationship with the leading edge of one pulse of said derived signal energy for utilizing said derived signal energy only when the leading edge of the other pulse thereof has a relative amount of spacing lying within a selectable range of values established by said univibrator under control of said altitude-responsive device as selectively and automatically designating at least one of said plurality of traffic zones.

KNOX McILWAIN.

References Cited in the file of this patent

UNITED STATES PATENTS

| Number | Name | Date |
|---|---|---|
| 2,134,716 | Gunn | Nov. 1, 1938 |
| 2,157,122 | Dunmore | May 9, 1939 |
| 2,252,083 | Luck | Aug. 12, 1941 |
| 2,301,929 | Budenbom | Nov. 17, 1942 |
| 2,361,437 | Trevor | Oct. 31, 1944 |
| 2,363,571 | Chaffee | Nov. 28, 1944 |
| 2,378,604 | Wallace | June 19, 1945 |
| 2,392,546 | Peterson | Jan. 8, 1946 |
| 2,403 603 | Korn | July 9, 1946 |
| 2,406,970 | Smith | Sept. 3, 1946 |
| 2,415,359 | Loughlin | Feb. 4, 1947 |
| 2,425,315 | Atwood | Aug. 12, 1947 |
| 2,453,970 | Charrier | Nov. 16, 1948 |
| 2,480,123 | Deloraine | Aug. 30, 1949 |
| 2,481 515 | Isbister | Sept. 13, 1949 |
| 2,501,109 | Wallace | Mar. 21, 1950 |
| 2,502,454 | Grieg | Apr. 4, 1950 |
| 2,513,282 | Busignies | July 4, 1950 |
| 2,517,540 | Busignies | Aug. 8, 1950 |
| 2,521,697 | Deloraine | Sept. 12, 1950 |
| 2,531 412 | Deloraine | Nov. 28, 1950 |
| 2,535,038 | Busignies | Dec. 26, 1950 |